Figure 1A:
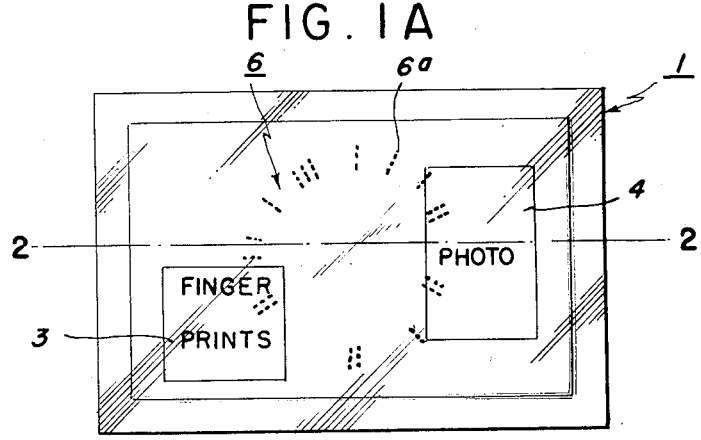

Nov. 24, 1959     E. W. JAMES     2,914,746
IDENTIFICATION SYSTEM
Filed March 27, 1956     9 Sheets-Sheet 1

MAGNETIC COATING
(IRON OXIDE)

INVENTOR.
EDWARD W. JAMES
BY
ATTORNEY

INVENTOR.
EDWARD W. JAMES
BY *A. A. Saffitz*

ATTORNEY

Nov. 24, 1959  E. W. JAMES  2,914,746
IDENTIFICATION SYSTEM
Filed March 27, 1956  9 Sheets-Sheet 4

INVENTOR
EDWARD W. JAMES
BY
ATTORNEY

Nov. 24, 1959     E. W. JAMES     2,914,746
IDENTIFICATION SYSTEM
Filed March 27, 1956     9 Sheets-Sheet 5

INVENTOR
EDWARD W. JAMES
BY *A. A. Saffitz*
ATTORNEY

Nov. 24, 1959  E. W. JAMES  2,914,746
IDENTIFICATION SYSTEM
Filed March 27, 1956  9 Sheets-Sheet 6

CARD ADMITTING BEARER
TO AREAS (A)(B)(C)

CARD ADMITTING BEARER
TO AREAS (A)(C) BUT
NOT (B)

SWITCH DISABLES
COMPARASION CIRCUIT
DURING PART OF CYCLE
OF NO INTREST

INVENTOR
EDWARD W. JAMES
BY *a. a. Saffitz*
ATTORNEY

Nov. 24, 1959     E. W. JAMES     2,914,746

IDENTIFICATION SYSTEM

Filed March 27, 1956     9 Sheets—Sheet 7

FIG. 9A     FIG. 9B     FIG. 9C

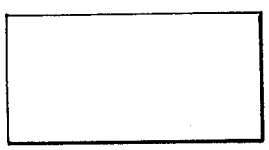 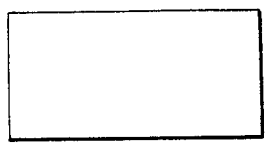 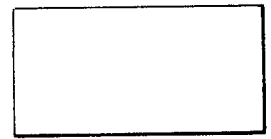

CARD PRESENTED FOR EXIT     CARD WITH AREA (A) CODE ERASED     CARD WITH AREA (A) CODE RE RECORDED

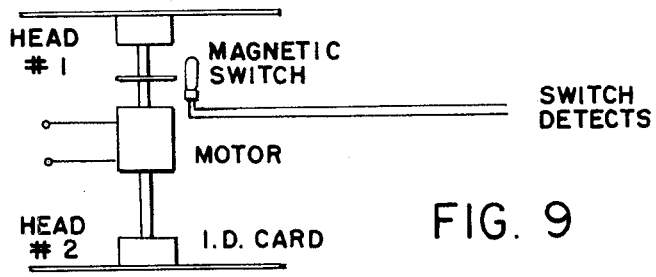

FIG. 9

1. CODE SPACE TO BE RECORDED.

2. NUMBER OF REVOLUTIONS.

3. ON FIRST REVOLUTION AREA (A) IS ERASED BY SWITCHING HEAD #2 TO ERASE SIGNAL DURING THAT PART OF CYCLE.

4. ON SECOND REVOLUTION HEAD #2 RECORDS CODE ON I.D. CARD THAT IS CARRIED BY SUBMASTER.

*INVENTOR*
EDWARD W. JAMES

BY *A. A. Saffitz*

*ATTORNEY*

Nov. 24, 1959     E. W. JAMES     2,914,746
IDENTIFICATION SYSTEM
Filed March 27, 1956     9 Sheets-Sheet 9
FIG. 11
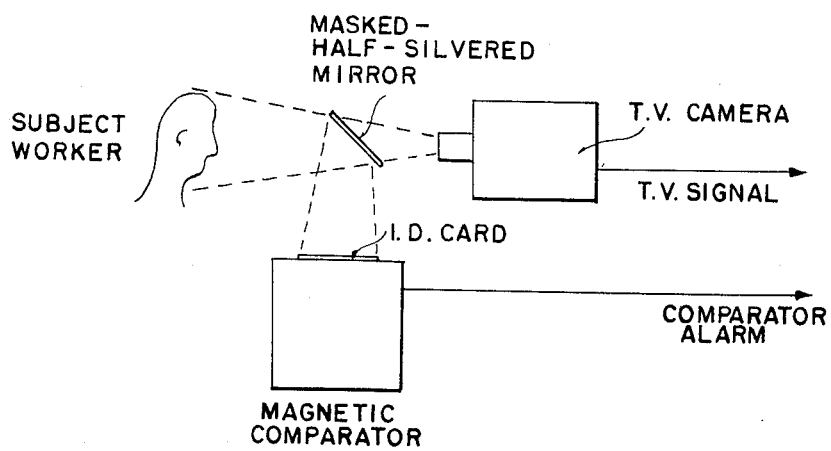
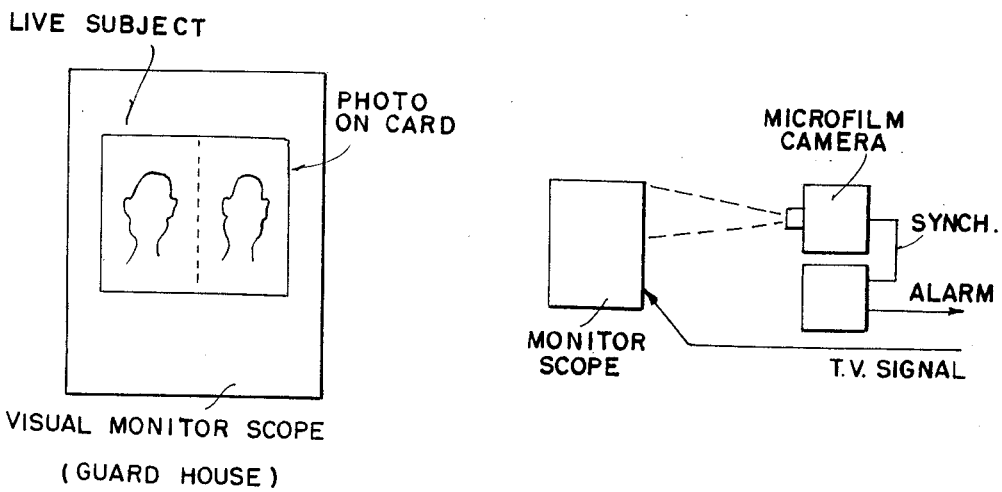
INVENTOR
EDWARD W. JAMES
BY
ATTORNEY United States Patent Office 2,914,746
Patented Nov. 24, 1959

2,914,746

IDENTIFICATION SYSTEM

Edward W. James, Kelton, Pa., assignor of one-half to Thomas J. Reardon, Chester, Pa.

Application March 27, 1956, Serial No. 574,254

9 Claims. (Cl. 340—149)

This invention relates to an identification system for checking the holder of a magnetically coded identification card against a magnetically coded master card to limit the holder from entering an area prescribed for reasons of military or commercial security.

There are many cases in which people entering a prescribed area must identify themselves before they are admitted. Reasons of military and commercial security, as well as convenience, dictate this necessary precaution. A permanent record of this entry is desirable to evaluate the effectiveness of the security system. I describe herein a new system applicable to these purposes in which special advantages of this system lie in its extreme flexibility in application in changing codes and in use, and in the secrecy features of the many codes which it may employ.

One object of the invention is to provide an automatic security system, capable of being controlled from a remote station, for converting magnetically secret-coded identifying information utilized in passing authorized personnel into limited areas, into signalling impulses which indicate the correspondence or lack of correspondence of such information with information on a master or sub-master card which is magnetically coded, said system being simple in construction, economical in operation and easily modified for unannounced code change to provide a great number of changes in identifying codings and master codings as is highly necessary and desirable under a rigorous security program.

Another object of the invention is to provide an automatic identification system whereby personnel authorized for certain areas or groups of areas will be passed exclusively into those areas and will be excluded from all other areas, each group having its own special magnetic code, and wherein all cards and admission equipment are of the same type.

Another object of the invention is to provide an automatic system for transmitting to a remote point, and there displaying for monitoring, and recording for future use the signalling impulses indicating the correspondence or lack of correspondence of the information on the presented card with the master card, and such personal information concerning the holder of the card as may be magnetically impressed on it, as well as the image of the holder's face and his photograph on the card displayed simultaneously by closed-circuit television and recorded on film or tape together with the signalling and information impulses.

Another object of the invention is to provide an automatic system for erasing all or part of the code impressed magnetically on the individual cards and recording in its place a new code as required, and to provide such a system that completes the whole operation in a negligible time as part of the routine procedure by which individual personnel leave the authorized areas.

Other and further objects of the present invention will appear from the more detailed description set forth below, it being understood that such more detailed description is given by way of illustration and explanation only and not by way of limitation since various changes therein may be made by those skilled in the art without departing from the scope and spirit of the present invention.

In connection with that more detailed description, there is shown in the drawings, in Figure 1A, a side elevation view of a magnetically coded identification card useful in the identification system.

Figure 1B:
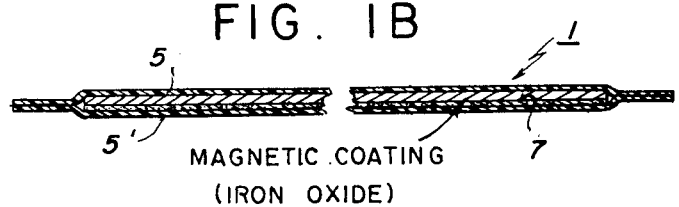

Figure 1B, a sectional view along line 2—2 of Figure 1A showing a coating of magnetic material.

Figure 1C:
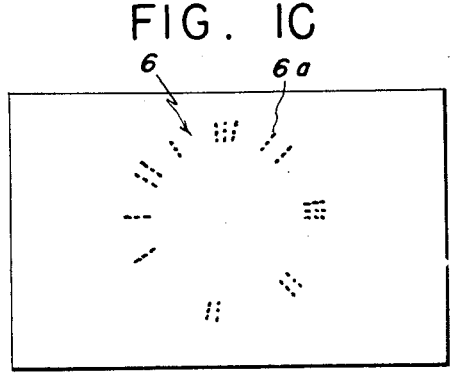

Figure 1C, a schematic view in plan illustrating a circular magnetic pattern.

Figure 2:
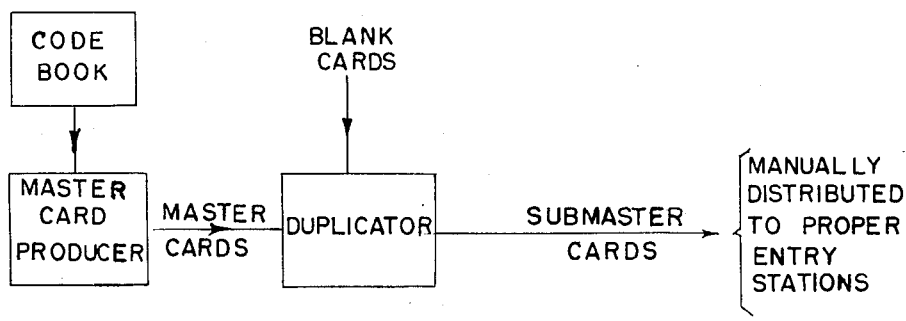

Figure 2, a schematic diagram showing the relationship of the code book for coding master cards and the duplication of identification cards for manual distribution to entry stations whereat the duplicates serve as sub-master cards for comparison with individual magnetically coded identification cards in the possession of holders.

Figure 3:
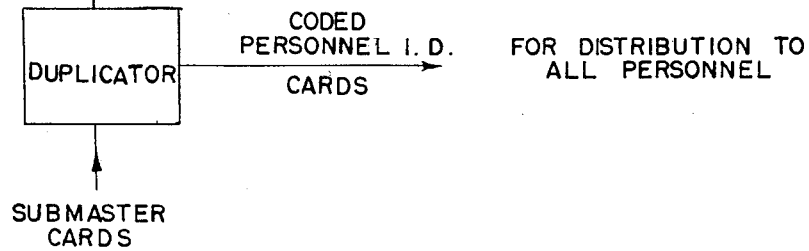

Figure 3, a schematic diagram showing the use of the sub-master card for the magnetic printing of individually coded identification cards to be put in the hands of authorized personnel.

Figure 4:
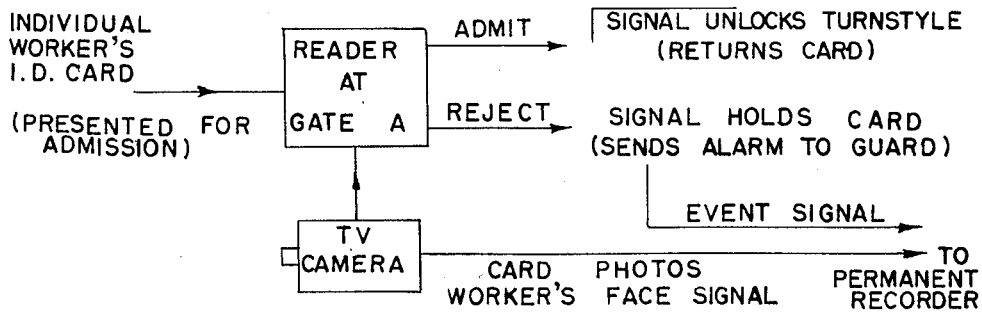

Figure 4, a schematic diagram of a reader and scanner device in accordance with the invention, and for the purpose of providing monitoring of the comparison of the TV image of the worker with his photograph on the card, and remote transmission means, and permanent recording of both visual and magnetic comparison events.

Figure 5:
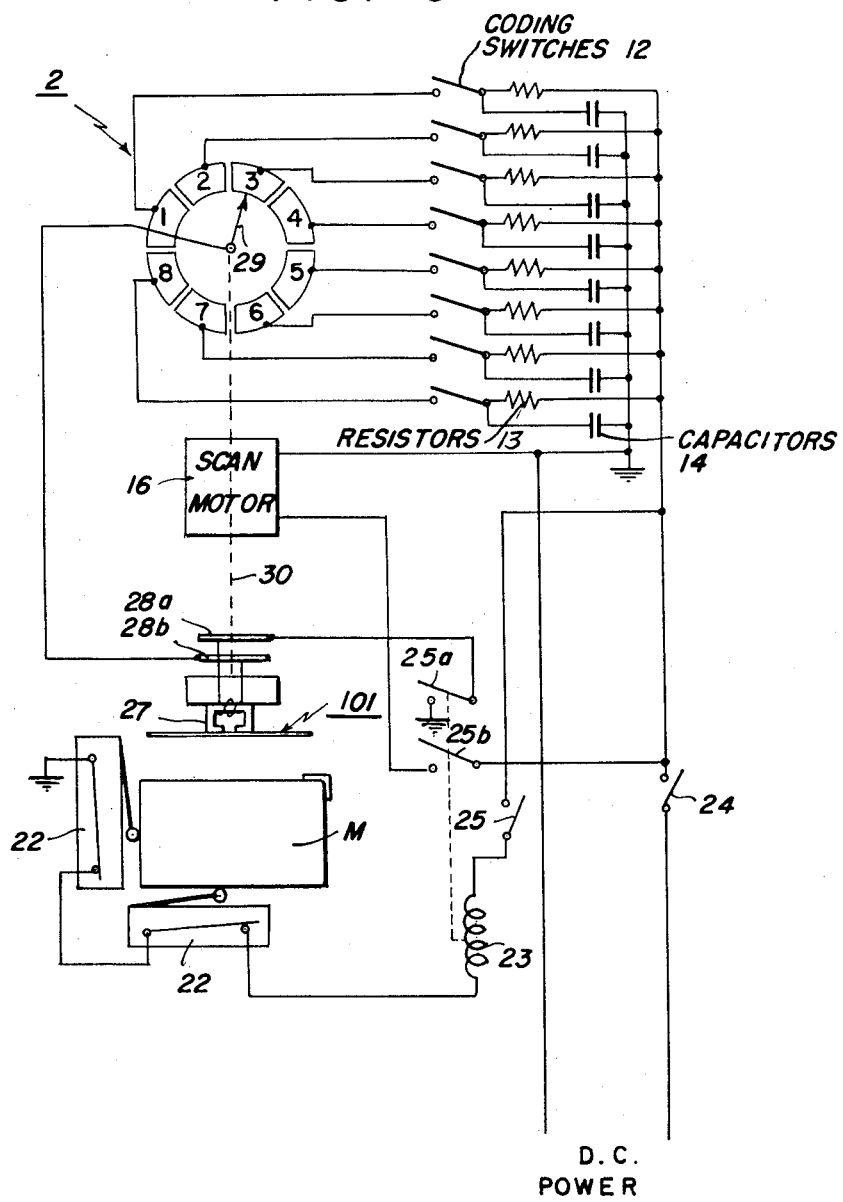

Figure 5, a circuit diagram showing the device for manual coding of master cards.

Figure 6:
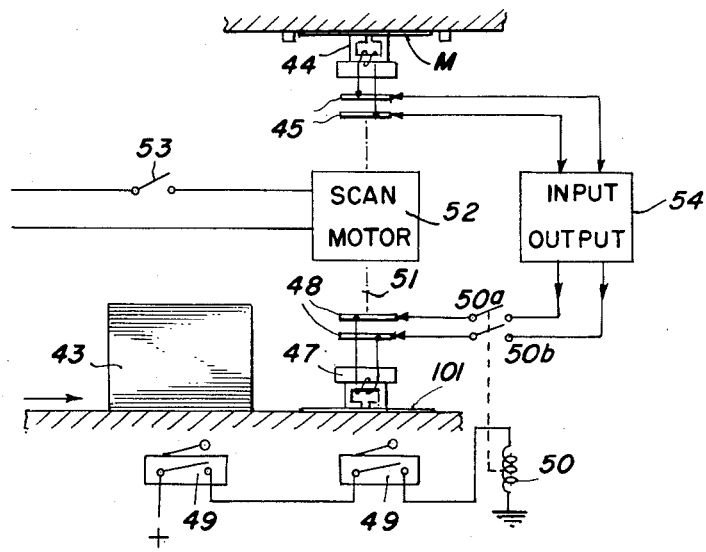

Figure 6, a circuit diagram of a duplicator device by which master card codes are automatically imprinted on sub-master blanks for distribution to entry stations and personnel I.D. cards are coded.

Figure 6A:
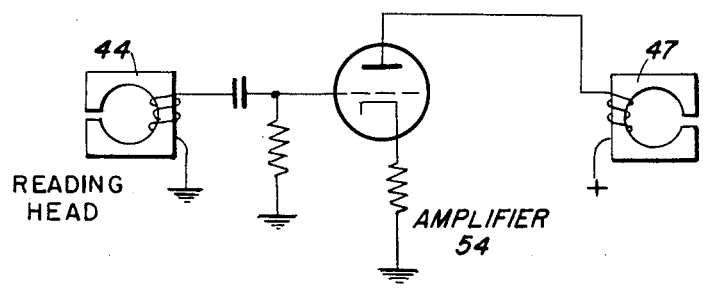

Figure 6A, the detailed circuit shown in Figure 6 as box 14, representing the duplicator amplifier.

Figure 7:
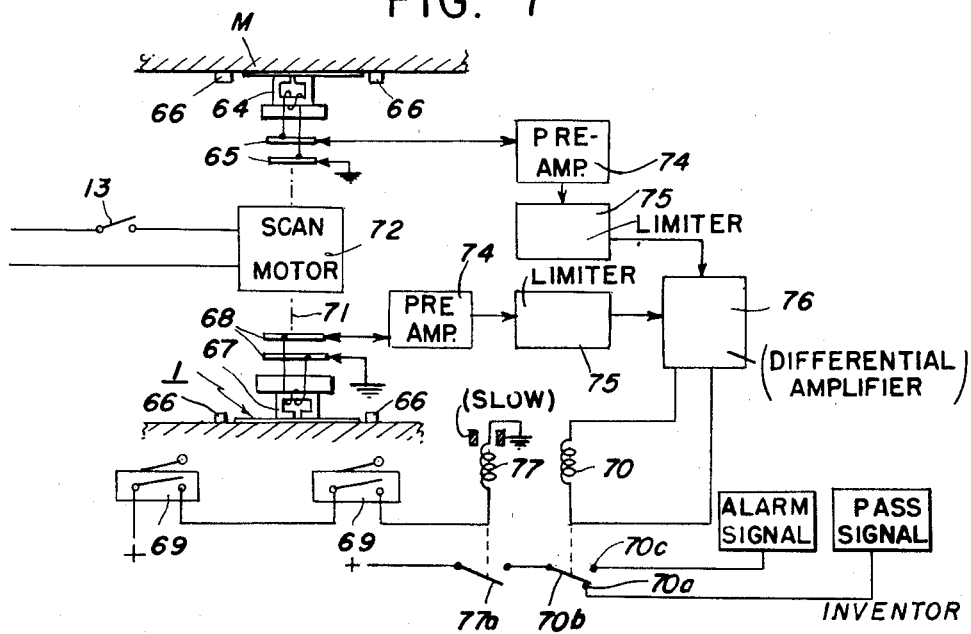

Figure 7, a circuit diagram of the reader device by which a signalling impulse is developed as a result of the correspondence or lack of correspondence of an I.D. card presented to it and the particularly coded sub-master card placed inside.

Figure 7A:
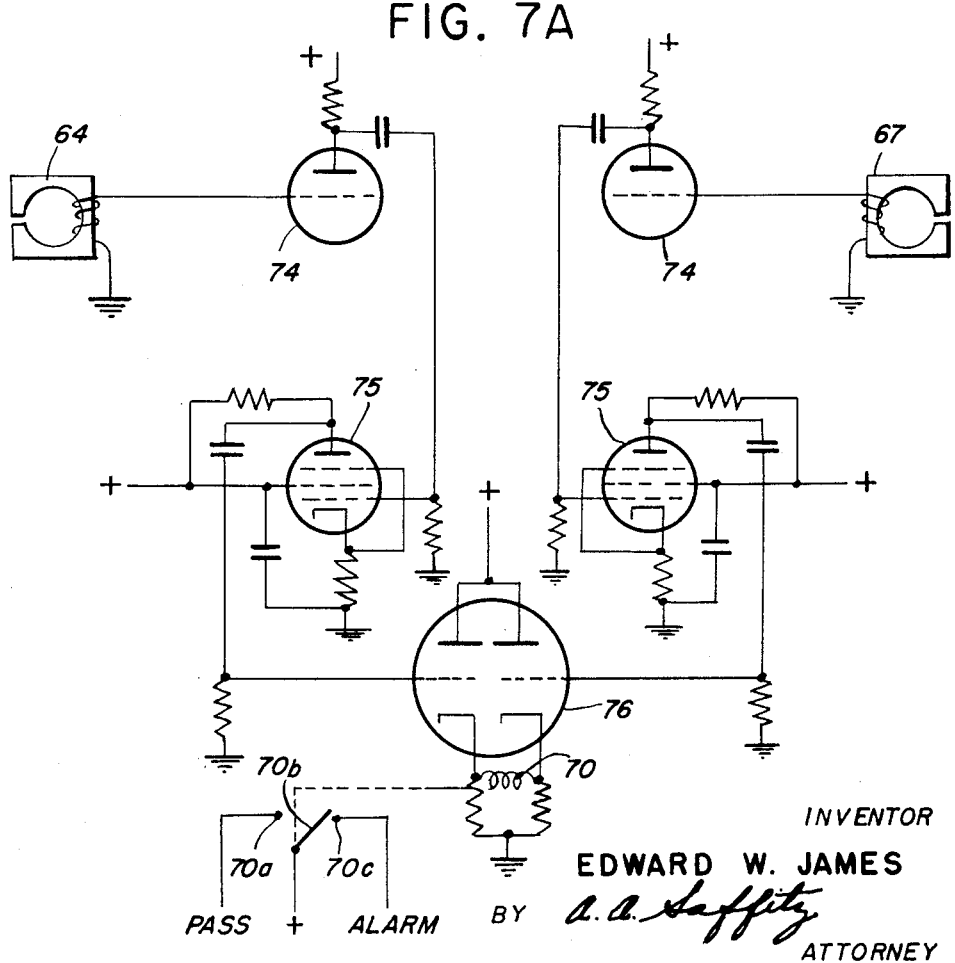

Figure 7A, a detailed circuit shown in Figure 7 as the several boxes preamplifiers 74, limiters 75 and differential amplifier 76.

Figure 8, a schematic diagram of the discriminatory admission feature of this system.

Figure 9, a schematic diagram of the automatic recoding feature of this system.

Figure 10:
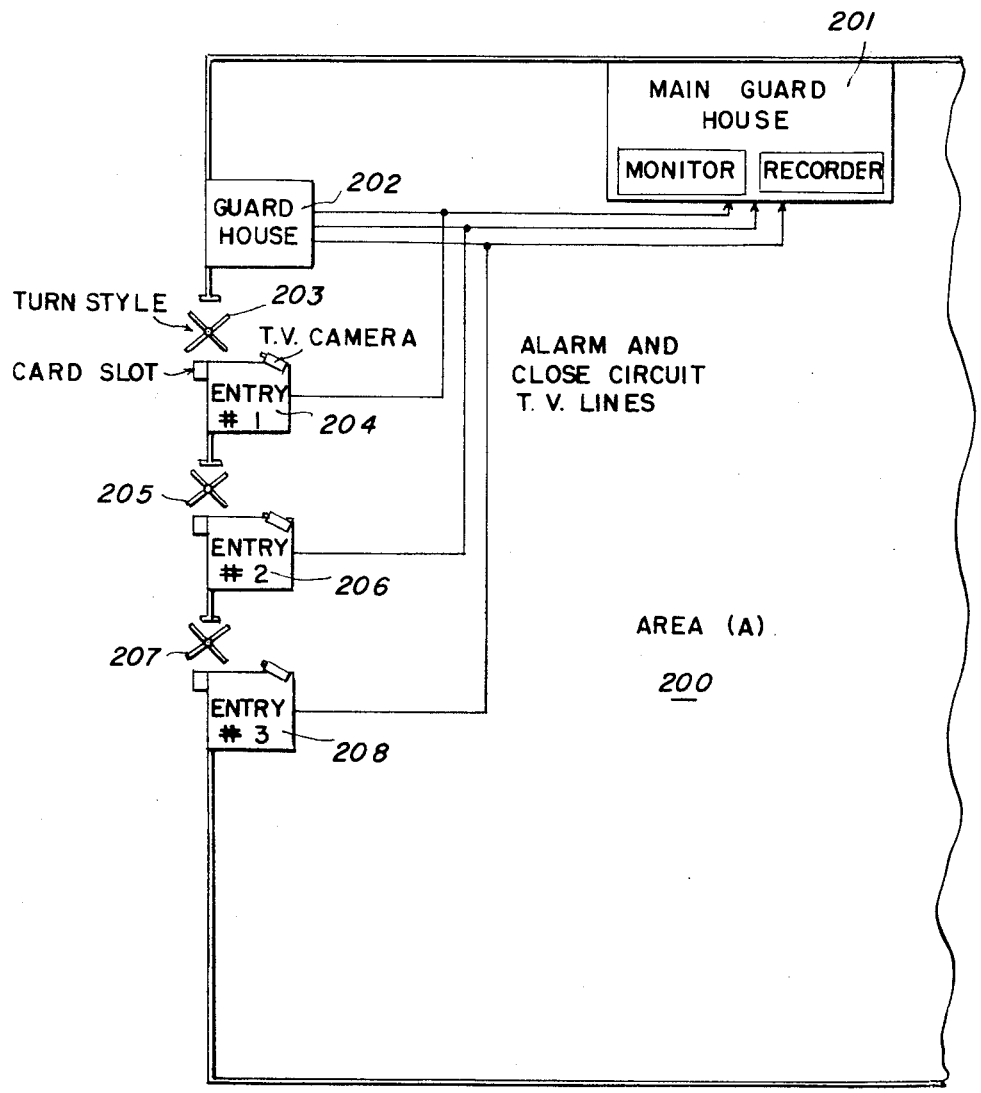

Figure 10, a schematic diagram of a typical entry installation showing a plurality of entry stations, a single nearby guard room and the central guard station interconnected in such a way as to provide signal paths to a permanent recorder.

Figure 11, a schematic diagram of the visual monitoring and recorder system by which the image of the subject's face and his photograph are simultaneously transmitted via closed circuit TV for visual monitoring and permanent recoding in a central guard station.

Mechanical key punch devices for punched cards, metallic plates, etc., have two drawbacks. First, the mechanism of their operation is immediately apparent and may be copied. Second, changing from one code to another, a feature of the utmost importance where there is no tie between the individual and the card except possession, cannot be sufficiently quick and economical. Hidden codes utilizing radioactivity, fluorescence, or phosphorescence while serving the secrecy function do not serve the function of economic and rapid changeability. The principle of magnetic coding utilized in the present invention serves these and secondary advantages in an almost unique manner.

The identifying component of the system is a card of any conventional shape, but probably rectangular. Similar to other identification, it could carry on it, photographs, fingerprints, or any written material. It would be laminated between transparent protective sheets. In this sandwich, one of the surfaces is coated with a magnetic particle coating of the type conventionally used for magnetic recording. A magnetic pattern may be conventionally impressed upon the magnetic medium by external means. This pattern is invisible. To be identified, the carrier of the card places the card in a slot of a device called a reader, which is located at the point of entry to a restricted area.

Utilizing standard magnetic media and recording elements is highly desirable. To gain the precision of performance the reliability required in such a critical application, a recording and reading resolution of high quality is necessary and is achieved by the present invention.

In view of the use of a larger recording gap then is conventionally employed, so as not to touch and wear the card, a high relative velocity is attained between the card and the magnetic head. The novel mechanisms used by the invention move the card either linearly or circularly at considerable speeds. Rapid readings have been more difficult to construct, operate and maintain in the prior art. The invention employs a reader which moves the head. The scanning time is thereby kept at a minimum and the card need not be accelerated or decelerated, but merely presented for scanning. By the novel mechanism employed, the recording can be accomplished at zero velocity if required, which adds further advantages to the system. The precision with which the code must be read and compared, together with the necessity for a rapid change of code, has resulted in the development of the submaster card system in which the scanning and comparison is done simultaneously and by elements that are rigidly mechanically tied together so that there is a minimum of potential shift.

This reader is provided a sub-master card with its own magnetic pattern. A scanning device in the reader reads the patterns of both cards simultaneously, compares them and either admits the person and returns his card, or rejects him and rings or otherwise signals an alarm. If a turnstyle type of entry is used, it may be automatically unlocked for admission and thereafter automatically locked so as to hold the person captive in case of a rejection. A guard or security officer then would answer the alarm. Although some guards would still be necessary, the total number required for safe operation of the system is considerably reduced and the number of effectively guarded entries could be increased for the same guard force.

The image of the subject may be transmitted by virtue of a closed-circuit TV system along with the photograph from the compared identification card which is presented for entry, to a remotely located security office where visual monitoring of the recorded I.D. and televised image is carried on and at the same time. Permanent records by photographs and magnetic tape may be made of the visual as well as magnetic code comparison at this station.

Like a skeleton key, some cards would pass all of many reading stations, while others in a coded "stop" key would pass only one. Depending upon on the code impressed on each card and the sub-master in each readers variety of stop gates may be installed. Thus in a large plant, a laborer would be given a card which would admit him to the yard only, but not into any of the buildings. A machinist would be admitted to the yard and into the building in which he worked. If the bearer is to be passed into a normally restricted model shop, he would be passed there also. A resident government inspector on the other hand, would be passed into all areas in the plant, as would the chief engineer, etc. This may be readily accomplished by the arrangement of different codes impressed on each man's card, and by the sub-master cards in the readers at the entry to each security level area.

The flexibilty of the system can be illustrated if the case is considered where a breach of security is feared and cards must be changed or reviewed. Badges with photographs have been shown to be inadequate when guards have passed unauthorized personnel as authorized workers.

Cards of absent workers are suspected of being used by unauthorized personnel. To combat this under the usual security system, additional guards are put on and all cards are collected, taken apart, changed and reassembled. At best this is a job of many days in some places. As a result these measures are only used in dire necessity.

The present invention overcomes this problem in many ways. Small recoding machines are available in each department, so that cards collected in the morning as men arrive can be erased and recoded automatically without taking them apart. The time required in this matter is one or two seconds per card. In this way one security area or several can be changed independently of the others.

Or, if desired, one section of the code can be plant wide, that is, a kind of "letter of the day." This could then be changed daily or periodically as required. A change of this type is more efficiently performed by the invention than the first method. In this case, the automatic readers at each entry station are equipped with a sub-master card carrying two codes; the pass code for that station and day, and the pass code for that station and the next day.

The cycle for the reading of each card at the entry station is as follows:

(1) scan presented card and today's code on sub-master simultaneously; accept or reject card as usual; if accepted erase card and recode with tomorrow's code; return card to worker. The time required for this cycle is so short compared with presenting and retrieving the card that no additional worker's time would be required. The guard's job of making new sub-masters for each change, and distributing them to the stations is all that would be required.

The security possibilities and the number of combinations available is very large. The magnitude of the changes possible becomes clear when one considers that 40 pluses per inch can be readily distinguished in a magnetic pattern. Taking only this number, 40, with the two cases of being in a certain place or not being there, the total number of usable codes becomes almost eleven million million.

Telemetering of part or all of the activities of the system to a central point or points is frequently desirable in certain applications. Since the monitoring of the entry of each individual is an automatic electromechanical operation, this permits significant derived information pertaining to it (card number, time of entry or exit, refusal, and subsequent action, etc.) to be recorded at the entry station as well as to be transmitted instantaneously to one or a number of remote points.

In this respect with the increasing application of machines to business operations (automation of business activities) the direct application of this method to provide telemetered time card information on attendance provides an important and desirable application of the invention. An advantage of this system is that the practice of having someone else punch a worker's time-card is automatically detected and readily discouraged, and the same card would also be the personal admission card.

The general scheme outlined above can be arranged in a great many ways and it will still fall within the scope of this invention.

To facilitate the understanding of the operation of the invention there is described a simple method of accomplishing the purpose.

In Fig. 1A and Fig. 1B is illustrated a suitable I.D. card 1 to be carried by workers for identification and admission to restricted areas, especially those under governmental security. It comprises preferably a rectangular card bearing information such as name, description, signature, photograph 4, a fingerprint 3, etc., which is encased in sheets 5 and 5 of transparent plastic, heat sealed to protect the card. The card is modified in two ways; (1) the back is covered with coating 7 of magnetic material such as is generally used for magnetic recording and (2), the plastic 3 is slightly thinner than is usually employed and is abrasion-resistant to withstand mechanical rubbing. A thin nylon or Dacron (polyethylene terrephthalate) film is used 0.003 to 0.025" thick, instead of cellulose acetate 0.02–.04". Other shapes may be used but for convenience in electronic and mechanical sorting, collating and tabulating machinery and in the interest of standardization rectangular cards are employed.

Fig. 1C of this figure shows a preferred form of magnetic recording which may be used to place a code on the card. The actual magnetic pattern would not be visible, but it has been drawn for purposes of explanation. The coding consists of the pattern in which pulses are recorded or withheld from certain positions and using a standard magnetic recording head.

All of the cards, from these original masters, through the intermediate cards or sub-masters, to the individual admission station cards and the individual workers' cards, may be produced in the same manner as described above. For security reasons, the copying device would be only in the hands of security police.

In Fig. 5 there is shown the structural elements comprising the reader 2. This reader is identical with the duplicator from a mechanical viewpoint. As a duplicator and as described in detail herein below, the device serves as a master card producer which working from a preset code can prepare master cards, duplicate master cards or duplicate working cards as well as read any of these cards.

The master card producer of Fig. 5 here described is the only manually operated device in the system. Since only a few such cards are required for each periodic code change, this is no hardship. Referring to the scanning head in the reproducer, reader and comparator, the other major components include a fixed commutator with a scanning brush, a scanning motor, a relay, a bank of switches, a set of resistance-condenser networks and a D.C. power supply.

The device of Fig. 5 also serves to set up the codes which may be suitably stored in a code file, for example, in book form or as a card file. From such code file, the necessary information is magnetically imprinted by the device upon the identification cards.

Figure 5 uses an eight pulse code, but any number besides 8 may be used, as long as it does not exceed the resolution of the magnetic material, particularly under conditions where the head may not actually contact the card as in the present invention.

A magnetically blank card 101 is placed in the slot. It is the purpose of the device of Fig. 5 to imprint magnetically on the card the code set up by the combination of positions of coding switches 12. Only when the master card M is in an arcuately predetermined position, as indicated by the snap switches 22, is the ground circuit to relay coil 23 complete. It is necessary that master switch 24 be On before the card can be imprinted with the code. Switch 25 is a single throw, single pole switch with spring return to open position. Whenever it is desired to imprint a code on a properly positioned blank card switch 25 is momentarily depressed (closed) for any short arbitrary time period. This switch 25 is so depressed each time a coding is to be imprinted on a card.

Under these conditions, relay contacts, 25a and 25b, close and 25a completes the electrical circuit to scanning motor, 16. The scanning motor is rigidly coupled to magnetic recording head, 27, slip rings, 28, and commutator brush, 29, by means of shafts, 30. As long as switch, 25, is depressed the motor will rotate the head over the card and the brush over the commutator. Contacts 25b will complete an electric circuit from ground to slip ring, 28a, through the coil of the recording head, 27, back through slip ring 28b to the commutator brush 29. As the scanning motor drive 10 moves the head 27 over different positions on the card 1, commutator brush 29 successively contacts the individual bars (numbered 31 through 38) of commutator 11 thus switching in successively the circuits containing coding switches 12, resistors 13 and capacitors 14.

The system is so constructed mechanically that once the card or any card of the same dimensions has been positioned in the device, when the head 27 is in the same relative position on the card the same coding circuit (switch 12, resistor 13 and capacitor 14) will be connected to the head by the commutator.

It is feasible to print the magnetic characters in the form of small rectangular areas of magnetic saturation at zero relative velocity between the recording head and the card. Thus if the head is brought into close proximity to the card whose magnetic surface is in a neutral or demagnetized state by virtue of magnetic erasing and an electrical signal perhaps in the form of a pulse is impressed on the coil of the head, a magnetic imprint will be made on the magnetic medium. If the head is then advanced to a new position and a second signal (or lack thereof) is impressed a series of pulses or spaces (similar to dots and dashes of the Morse code) is produced which may be read at a later time. Although there is illustrated a method for producing a circular pattern, other alternate configurations may be readily set up.

The operation of the coding circuit is as follows:

As soon as master power switch 24 is closed the D.C. power is impressed across each set of resistors 13 and capacitors 14 which are in series. Thus the capacitors will be charged to the power line voltage through the resistors. If none of the coding switches, 12, are closed, and the coding cycle is started by depressing switch 25 as described above, no signals will be magnetically imprinted on the card, since no electric circuits will be closed through the recording head 27 during any part of the scan. If any combination of coding switches 12 are closed, when the scanning motor moves the head into the corresponding position on the card, the commutator 11 and its brush 29 will complete the circuit to the proper coding circuit whose switch 12 is closed and the appropriate condenser will be discharged through the recording head 27, producing a magnetic imprint at a specified position on the card in accordance with a specified code. Thus the pattern of closed and open coding switches exactly represents the desired code.

The use of the capacitor discharge for recording is not necessary but is preferred since it tends to improve the clarity of the signal. The discharge will occur in a short time compared to the peripheral motion of the commutator brush and will therefore be well defined and denser than if it were produced merely by switching in a D.C. voltage. In actual practice, the momentary contact switch 25 used for starting the code cycle need be depressed for only a few seconds for each recording. There is no necessity to have the motor running at full speed before starting the coding, nor need the motor be stopped after precisely one revolution. Additional revolutions would impress additional signals on precisely the same spot on the card. Thus the complete coding would be accomplished in the minimum time that the switch could be held closed, while holding it closed overly long could not damage the record. The operation of the system may more readily be understood by noting the steps that occur as we go through the procedure of recording a master card, reference being made to Fig. 5.

Step I—Turn power switch to "on."

This applies A.C. line voltage to the open relay armature and to the resistor rectifier condenser circuit. A D.C. voltage appears at the point so marked. The condensers C become charged through the resistors R.

Step II—Set switches to proper code.

Each of the "code select" switches must be set to the position open or closed depending on the code selected. Only eight switches are shown here but the principle is the same with more. Each switch left open isolates its condenser from the commutator. Each switch closed connects the condenser to a commutator bar.

Step III—Put blank card in place.

When the card is pushed into the recording position, it actuates the two positioning switches. If the card is not exactly in the right place one or both of the switches will remain open, thus disabling any further operation. In this way every card will be recorded in the same place with respect to two of its edges, and the reading problem is less critical. The operation of both switches at the same time completes a ground circuit for the coding relay.

Step IV—Press the code switch.

This momentary contact switch closes the code relay circuit. If a card is in place as described in step three, this relay closes. It completes two circuits; it completes a ground circuit to the recording head and it starts the scan motor. The scan motor rotates a brush on the commutator and also the recording head over the blank card. As the head takes up each new position over the card the brush sweeps over a corresponding commutator segment.

Each segment which is connected by one of the code select switches to a condenser allows that condenser to be discharged through the brush, slip ring, recording head, second slip ring and then to ground. Any segment not connected to a condenser in this manner produces no effect in the recording head and therefore on the card.

A pattern of radial pulses is recorded on the card in positions determined by the commutator spacing and the selector switches closed and open. While one revolution of the scan motor is sufficient to record the pattern no matter where it starts from, more than one will do no harm since the discharged condensers will not have time to recharge due to the R.C. time constant of the charging circuit. In any case, if a second pulse were recorded it would be precisely on top of the first. A revolution counter or a timing circuit may be used to keep the unnecessary revolutions of the scan motor to a minimum.

During the record time the card should be clamped to keep it from being withdrawn with a consequent blurred pattern. The speed of the recording head has negligible effect on the recorded pattern. Even though recording begins while the scan motor is starting from a standstill sharp pulses will be recorded if the discharge pulses through the head are sharp. Some spreading will occur due to a gap which will be necessary between the head and the magnetic medium on the card, but this is a minor effect.

Step V—Remove recorded card for next operation.

Step VI—Duplication.

The duplicator of Fig. 6, is loaded with the cards to be reproduced and with a pile of blank cards, which are automatically fed to it. The machine simultaneously reads the master card, amplifies the code signals, and re-records it on a blank card that has been fed into position.

As shown in Fig. 6, the master card M carrying the code is copied by the duplicator device illustrated in detail. Master card codes are automatically imprinted on sub-master blanks for distribution to entry stations and personnel I.D. cards are coded.

A blank card 101 is automatically fed into position from a stack 43 by means well known to the art. A reading head 44 with its slip rings 45 scans the exact area of the recorded code by virtue of accurate stops which position the card in the correct spot. A recording head 47 with its slip rings 48 scans an identical area on the blank card. Position indicating snap switches 49 complete an electrical circuit to relay 50 only when the blank card is in the correct position. Both heads are rigidly connected via shafts 51 to scan motor 52 whose electric circuit is completed by switch 53, putting the motor and the attached heads into rotation. Thus if the scan motor is rotating but no blank card is in place, the relay 50 is open and the amplifier 54 is open at its output, because of the position of contacts 50a and 50b. Head 44 will read the code and send it to the amplifier continuously during each revolution. When the feed mechanism advances a blank card to the proper position, the switches 49 will close relay 50 and the amplified code being read off the master card will be recorded on the blank in identically the same pattern. Due to phase shift through the amplifier it is desirable to introduce a small amount of mechanical lead between the two heads as they are fixed to the motor shaft to compensate.

By using a reasonably high signal the saturation of the magnetic medium of the blank card may be utilized to keep the recorded level of all cards very nearly the same. Some pulse sharpening circuits may be used in the input to the amplifier to minimize spreading of the master card signal and to reduce noise.

Fig. 7 illustrates the third type of device required in the system, the comparator. In the simplest form of the subject system, each point of entry has a comparator unit and a turnstile. In the comparator unit is a coded card with exactly the code on it which it is desired to admit. A cardbearer presents his card, which is read and simultaneously compared with the master. If the codes do not check in every detail, pulse for pulse and space for space, the presented card is held, the turnstile locked, an alarm sounded, and in some cases the bearer could be mecanically detained. The mechanical elements of the simple comparator are identical with those of the duplicator described above, except that instead of feeding blank cards from a stack, the feed mechanism presents the worker's presented to it. Electrically the two units are quite different.

Thus master card, M, is placed in the device. The I.D. card 1 is presented for admission. Reading head 64 scans the proper area of card 6 (Fig. 1A) and sends the signal through slip rings, 65. The card 1 is accurately positioned by stops 66. Card 1 is scanned by reading head 67 with its slip rings 68. Only when the card is in accurate position will snap switches 69 close the circuit to relay 77. Both heads are rigidly attached to scanning motor 72 via shafts 71. Switch 13 controls the power to the motor 72.

The signals read on each card via its own reading head are fed respectively to two preamplifiers 74 and thence to two limiters 75. The purpose of the limiters is to ensure that within limits the signals from the two cards will be nearly the same amplitude even though they were recorded under different conditions and read under different conditions.

These limited signals are then both fed to differential amplifier 76. A differential amplifier operates on the difference of its two input signals only. Thus zero input to both sides would result in zero output. A pulse to each side at the same time and of the same amplitude would result in zero output. But a pulse to either side with no signal to the other would result in full amplifier output to relay 70 and in this case an alarm signal on contact 70c which may be used to operate any or all of several devices or circuits.

When a card is presented for validation against the master card proper positioning is sensed by snap switches 69. When both switches are closed denoting correct positioning in both dimensions, delay relay 77 is energized.

After a slight delay, contacts 77a close thus energizing the arm of single pole double throw contacts 70a, 70b, and 70c of relay 70. At this time two possibilities exist: The card presented agrees in every detail with the master card and, as described above, differential amplifier 76 shows no output thus leaving relay 70 unenergized and contacts 70a and 70b connected. A pass signal will appear on 70a. Failure of the cards to agree in every detail, however, will cause amplifier 76 to have a full output, energizing relay 70 and causing contacts 70b and 70c to connect. An alarm signal will appear on 70c.

Fig. 7A shows the electronic elements comprising the functional boxes of Fig. 7. Operation is as follows:

The pulses on the master card M induce a voltage in the coil of reading lead 64 which is amplified in preamplifier 74. The amplified signal is then fed to a pentode limiter 75 whose function is to provide an output signal to one grid of differential amplifier 76. This signal will be limited to a fixed magnitude independent of the input lever by the adjustment of the pentode limiter 75 operating bias. In an exactly similar manner the pulses read by lead 67 from the card being presented for validation are preamplified (74) limited (75) to the same magnitude and presented to the second grid of amplifier 76. If there two grid inputs are the same at every instant (zero or same magnitude) the currents through each half of the differential amplifier will be the same and the voltage drop across both cathode resistors will be identical. The ends of relay coil 70 being at the same voltage, the relay will not be energized. If, however, either grid receives a different input at the same instant, one side will conduct more than the other, the voltage drops across the cathode resistors will differ and relay coil 70 will receive a current and become energized.

The discriminatory admission means which is illustrated in Figs, 8A, 8B and 8C is an important feature of the invention.

Discriminatory admission in the system is the feature that allows the admission of various personnel only to certain areas or combination of areas without allowing admission to others. This type of security rule is in common use, and is usually accomplished with color-coded cards or badges and special guards.

Figure 8A:
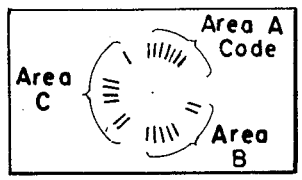
Figure 8B:
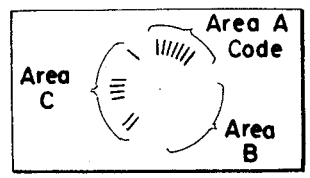
Figure 8C:
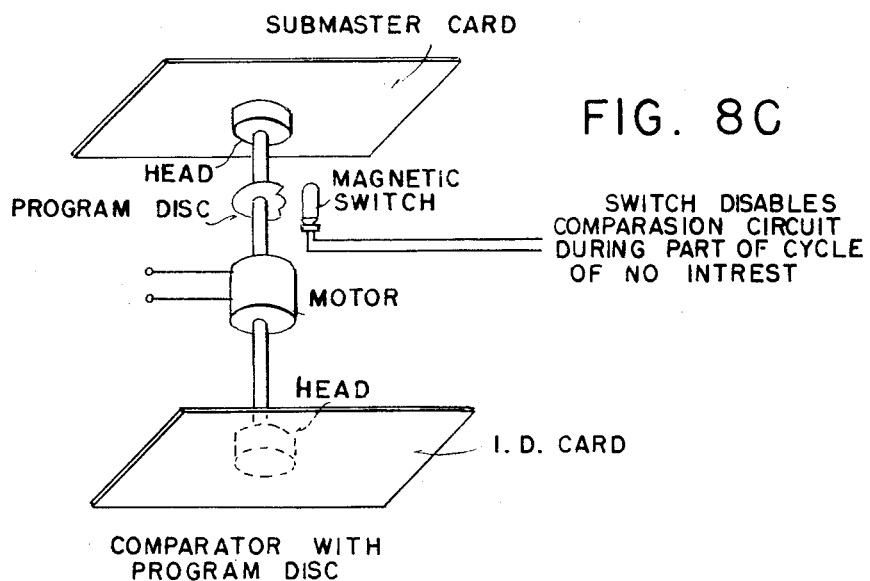

A simple way to achieve this feature in the magnetic identification system of the present invention is shown in Fig. 8A, 8B and 8C. The binary (or other) code that is impressed magnetically on the workers' cards can be divided into parts each one of which represents a security level. Only those persons who are permitted in a given area would have the proper code impressed on that particular part of the card corresponding to the area in question. The others would have no code or an incorrect code impressed on that part of the card. Each comparator at a given admission station would be arranged to read only that part of the card on which the pertinent code appeared.

This the area A, area B and area C codes shown in Fig. 8A constitute discriminatory admission security levels on a master, sub-master or I.D. card, and admit the bearer to areas A, B and C. In Fig. 8B the card is shown admitting bearer to areas A and C but not to area B.

In Fig. 8C the essential features of the comparator are shown. The discriminatory admission is controlled from the sub-master card. Conveniently, the comparator assembly is one which stripped to its bare essentials and as shown in Fig. 8C, includes a motor, a pair of reading heads and a switch.

The magnetic switch disables the comparison circuit which may be the type such as is shown in Fig. 7, during that part of the cycle in the simultaneous reading of the sub-master card and of the I.D. card where coded information is intentionally excluded from the sub-master card.

This intentional exclusion of coded information is brought about by employing a program disc which serves as an effective overlay to screen from comparison coded information on the sub-master or master card shown at the top of Fig. 8C.

The coded magnetic indicia 6 (see Fig. 1A) on the master card are in circular array and in a ring of predetermined radial width. One way of eliminating a sector of the magnetic indicia radially disposed in the ring area on the sub-master card is to mechanically block this area from comparison by fixing the program disc illustrated in Fig. 8C to the shaft of the motor driving the heads for the sub-master card and the I.D. card. The magnetic switch is actuated in accordance with the movement of the peripheral portion of the program disc, said program disc being cut out at its peripheral area where the reading on the submaster card is to be made, so that the switch disables the comparison circuit during that part of the cycle of comparing (reading) which is intentionally excluded.

It is obvious that other means may be employed for intentionally excluding a coded sector on the master or sub-master card, since all that is necessary is to disconnect the circuit during the reading and comparing cycle for a specified time period corresponding to the length of sector excluded during the rotation of the reading head under constant controlled conditions.

In general such disconnection may be accomplished either by disconnecting the electrical system in the differential amplifier circuit or in the alarm circuit, or by mechanically disabling the reading heads at the proper part of the cycle. Thus the comparator at each station would read, compare and pass or reject only on that part of the code pertaining to that station. A card in which codes for two or more stations were impressed would pass the bearer to those stations. This function is of course a very important one in security systems.

Another important advantage of the invention at this point is the possibility of taking information off the card at any time if that is required. For example, if personal time-card information, or identification for stores removal is required, the same technique described above may be used. That is in addition to all other features of the comparator, there would be a programming disc also connected to the scanning shaft. This disc, by contacting a switch mechanically, by electronic gating, or by other means determines and delineates the part or all of the code impressed on the card. Part could be made to compare with parts of the master card in the standard way. Other parts could be read or recorded directly or indirectly after transmission from a storage device. Still other parts could be ignored completely.

The system of using sub-master cards for comparison at pass gates although is not necessary. Instead a memory system using vacuum tubes or other equivalent elements could contain the required information to which the presented card could be compared. Considering the large amount of equipment required for this method compared with that proposed, as well as the increased time required for making changes, the former method outlined above is preferable for simple installations, but for special purposes where large storage facilities (banks of memory storage devices) are available, the latter method may be desirable.

Basically the form and pattern of the code are not the only ones utilizable by the present system. A linear pattern may be used, or a combination of one or more sets of linear and/or circular patterns. It is merely that a single circular pattern provides at the same time a sufficiently large code selection and still can be produced and read in the simplest possible way. A circular scan can make several traverses in a very short time without complex and precisely fitted mechanisms.

Thus the identification can take any desirable form, i.e., any shape in two dimensions, a rectangle, a circle, etc., or any three dimensional form, particularly a cylinder for purposes of rotating the identification instead of the heads. Any but the card form seems to be less convenient and more likely to invite curiosity in use as a security system.

While some form of ferro-magnetic material is employed, its exact form need not be limited. Any suitable material which can recieve and store a magnetic signal and still be cleared by erasure as required, may be employed.

Other codes than binary may be used; pulse position, pulse width, pulse height, frequency modulation, etc., or combinations of these. The coding and reading equipment for the binary is the least complex and therefore desirable.

Although a plurality of "rotatable heads" instead of the present rotating has been employed heretofore, a distinctive advantage of this novel means of the invention is provided: A set of "rotatable heads" which are moved intermittently by a ratchet device to bring them into the proper relationship with the recording media, requires recording to be done at a standstill. Playback is accomplished by a return motion under the action of a restoring spring.

In contrast the invention presents the rotation of the heads to be continuous during the operating cycle and registration with the recording medium is accomplished both for recording and reading by timing rather than by spatial registration.

This scanning head consists of a magnetic recording head of the design well known to the art, but mounted on a plate which is connected to the shaft of the scanning motor. It is mounted on this plate in a spaced relation to permit the recording gap to rotate in a plane, always radial to the center of rotation and preferably at a radius of half an inch or so. In addition the plane thus swept out by the gap is readily accessible to cards presented outside of rotating system.

A card of the type described above is then brought into this plane by suitable guides. During the scanning motion, then, the recording gap sweeps an annular area on the card. The head may be in actual contact with the card or at a very small distance from it. If new signals in the form of current pulses are passed through the coil of the recording head, magnetic patterns may be placed on the card in the annular area.

Figure 2 illustrates how the system may be divided up into three steps using different units and involving different people. In general the problem is to provide protection of several different security level areas which may overlap or contain each other. Every level has one or more entries through which workers may pass from one to the other area or to unrestricted areas.

In Step I of Figure 2 a code book is shown from which codes are directly taken for each security level. For even a few pulses the possible number of codes becomes very great. (40 pulses yield about eleven million million different codes.) For those to be useful in the proposed method of coded security levels, they must be chosen with this in mind.

A code or pattern is thus chosen for each level to be protected, and a master card is made of each one. A master card is precisely like a worker's card except that it carries the designation of an area instead of the man's name. Each pattern is set up manually on the master card producer and a single card recorded with each pattern. These master cards are then manually fed into a duplicator.

Blank cards are also fed into this unit and a set of sub-master cards are copied from each of the original masters. The number of sub-masters in each set will depend on the number of entries in each particular area. In addition some extras would be made for filing and for encoding all the workers' individual identification cards. The sub-master cards produced above are then distributed to their proper entry stations by guards.

The duplicator illustrated as two functions: (1) It is used to produce sub-master cards from master cards for distribution to each entry station of each security level, and (2) it is also used to impress on each employee's card the proper code for the area in which he works. This may be done with appropriate sub-master cards either at a central location or with machines located at duplication stations throughout the restricted zone.

Large numbers of cards may be processed by this unit for each sub-master, by providing known automatic card feeding mechanisms which feed one card at a time from a stack of cards into a position which is indicated by the operation of a set of switches. This position is the same with respect to the rotating head shown as was the head in the master card producer.

In general the machines used to produce, alter, or read cards are so adjusted that the rotating heads sweep the same path on any card properly presented. With the duplicator, twin heads are used. Both are rotated by a scan motor and each scans a different card; one the sub-master, one the blank card to be reproduced. For simplicity the scan motor is shown in constant rotation.

Unlike the case of the master card producer, no synchronizing is necessary between the reading and recording heads, since they are rigidly coupled. Any phase shift between the master code and the reproduced code due to time lag in the amplifier is constant and therefore subject to compensation. The gain of the reading process and the sharpness of the reproduced electrical signal are both functions of the scan speed.

During reading and comparing, if the card being presented is in every way identical to the sub-master already in the machine, the scan motor starts each of the reading heads, which will sweep over an identical magnetic pattern in precise synchronism. This occurs because when both cards were originally recorded (probably from the same sub-master) care was taken that the patterns should occupy the same relative positions on each card. Since the two read heads are rigidly coupled together, the trains of pulses from each card will then be presented to each preamplifier pulse for pulse at the same time.

Effective linear speeds of 7½ to 15 inches per second give sufficient gain when the head is in effective contact with the magnetic medium. Greater speeds are to be expected here where a gap must be present. In order to preserve some pulse form it may be necessary to use higher speeds. A scan speed of 600 r.p.m. would give a linear velocity of 30 inches per second with a pattern diameter of one inch. All these figures are quite reasonable.

Step VII—Reading and comparing.

The reading has already been described with reference to the unit in Fig. 5 and is used to compare the individual worker's cards with the proper sub-master for the area. From a mechanical point of view this device is identical with the duplicator described above. The amplifiers and the operation are quite different, however.

The card being presented is placed under the lower or read head. As before a set of switches sense when it is in the proper position for the cycle to begin. A sub-master card lies under the upper head also used here to read. Normally with no card presented to it the machine is disabled so that the amplifier output marked alarm is disconnected. The scan motor is also at rest. When a card is in place, the scan motor starts and after a sufficient delay to allow the motor to arrive at full speed, the amplifier circuit is enabled.

In the duplicator the master card containing a code is read by one head (see Fig. 8C). The signal passes through slip rings to the input to an A.C. amplifier of sufficient band width to preserve the pulse form. The output of the amplifier passes through the contacts of a relay so that the connection is broken unless a card is in place under the recording head. From there the amplified signal goes through another set of slip rings to the recording head. As before, a single revolution will be enough to read the coded card and transfer the pattern to the blank one. More than one revolution can be handled in exactly the same way as with the master card producer. Whatever programmer is used would eject the recorded card into a bin and place the next card in position.

At the output of each preamplifier, the limiters employed chop each pulse from each card to the same size. Both sets of pulses are then fed into a differential amplifier (one whose output is the difference between two inputs). Since the pulses from each card occur at the same time (assumed identical patterns) and are of the same amplitude (due to limiters), the two inputs to the differential amplifier are always identical and their difference is always zero. In other words as the two cards are scanned, when the condition reached is no output from the amplifier, no alarm rings, or signal is given. The timing circuit is arranged to test the comparison for as long as necessary and if no signal is received the test is stopped and the card automatically returned to the worker.

If the presented card carries the wrong code, a single error in the position or existence of a pulse is sufficient to feed the differential amplifier an unbalanced input and thereby produce an output or alarm signal.

One of the basic advantages of the present system is the provision of quick and economic automatic recoding, either on a periodic basis or when there is fear of a breach in security.

Although the description of the simple A.C. amplifier shown in Fig. 6A duplicator amplifier and the comparator circuit comprising a preamplifier, limiter, differential amplifier and relay coil in Fig. 7A has not been set forth in detail, these are conventional components as will be seen from Figs. 6A and 7A, respectively, and their operation is believed to be adequately described in the foregoing comprehensive description.

The operation of the device in Fig. 9 is as follows: When the I.D. card is presented to the comparator at one of the exit stations, the same procedure is followed as for entry. That is, both I.D. card and sub-master are scanned simultaneously and the signals compared. If they agree, the differential amplifier receives no net signal and the output relay indicates acceptance. This signal operates a relay which starts the next part of the cycle.

By virtue of the program disc (see Fig. 8C) which is rigidly fastened to the scanning shaft, the position of any particular part of the impressed codes can be detected. This is accomplished by cutting away a portion of the complete disc at a particular length of periphery. By sensing this cut-away section photoelectrically, magnetically, inductively, capacitatively, or by other means, a signal may be generated at variously located points to initiate or disable the action desired. The part of the impressed code referring only to personal information but not involved in entrance acceptance can be ignored if desired, or read out to be used for other purposes.

The "program disc" is the means by which the location of that part of the code which is to be renewed may be located for erasure and for recoding. Thus when acceptance of the old code has been signalled, a relay is operated which applies an erase signal to the I.D. card read head. Only that portion of the code is erased that is to be renewed. Next a separate read head which looks at an outer ring of the sub-master card is connected via amplifier to the head on the I.D. card and the code on the sub-master is copied on the I.D. card in the erased area that formerly carried the old code. This completes the recoding and the card is returned to the bearer to be used for entry the next day with the new code of the day already impressed on it.

In Figs. 10 and 11 are shown embodiments of recording means and telemetering means for producing a record of the checking operations which are automatically or semiautomatically carried out. In Fig. 10 a typical entry installation is shown where a television camera on a closed circuit is provided at the entry station and at a remote point the closed circuit from the television camera permits visual monitoring, automatic and semi-automatic recording.

Closed television circuits are known. Microfilming devices for recording data from the cards are also known. The production of micro-film records may therefore employ many of these known procedures and the visual monitoring in the remote central station may utilize available closed circuit television equipment, as may be suitable.

For example, a micro-facsimilie system as shown in U.S. Patent 2,275,898 may be used for putting the extracted data from the entry station on film. It not only records the information desired on the film but also appropriately records the generation of the alarm signal in Fig. 10 where lack of correspondence between the sub-master card and the coded I.D. card is shown.

A suitable closed television circuit which may be employed is as shown in U.S. Patent No. 2,177,365 which can scan the cards in the same manner that it scans picture film and can be coupled with the photographic apparatus for producing micro-records.

Where the situation arises in which it is essential that the person desiring entrance into a restricted area is not only to be screened at the local entry station but also at the central station and all of the features of security are brought to bear, the device shown in Fig. 11 provides a comparison between the photograph of the I.D. card and the televised view of the subject worker. A half-silvered mirror, suitably masked, splits the image received to place the photograph image next to the image of the live subject on the visual monitor scope and this juxtaposition of the images is the view which is transmitted by the closed television system. This transmitted assembly may likewise be recorded and further connected to the alarm signal as is shown in Fig. 11 by employing the micro-film camera in syncronism with a tape recorder for actuating the alarm, these elements employed directly with the monitor scope at the entry station.

Other uses may be served by the present system. For example, as well as identifying the card by its code, the admission machine could be made very simply to record on the card itself a record of the transaction; the use of the card, the amount and nature of the merchandise purchased, the airline trip secured, etc.

Such cards include courtesy cards of all types in the patent, if possible. This would include charge cards for department stores, gasoline, supermarkets, etc., check cashing cards, airline credit cards, auto rental cards and the like. In this connection it should be noted that cards that have become obsolete or poor risks could be rejected individually by introducing the particular numbers into the scanning machines at the various points of presentation. While this method is now used on a manual basis the automatic method would be faster, more foolproof and much simpler for the clerk.

This record would then represent a check for the purchaser on the bill rendered him. Reading of this record would have to be done at a designated station. The further advantage could be gained of putting a selective limit on the maximum credit of the individual without the necessity of circulating information to branch offices by teletype or other means with minimum lag. In this system the information would be carried by the prospective purchaser himself even without his knowledge, if desired.

The present system could also be used in the removing from inventory of material which normally must be signed for. In such a system materials in different storerooms could be made available to personnel of different levels by virtue of a differently coded card. The automatic recording of this removal in the name of a particular individual would also be accomplished. Any pattern of selectivity could be achieved in this system in the same manner as with admission.

Along these same lines a meritorious feature is the use of the system for transmitting via a card or perhaps a larger medium, information such as military orders, etc., which it is required to keep secret from the individual carrying them without the necessity of committing them to an elaborate code.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

Having described my intention, what I claim as new and desire to secure by Letters Patent is:

1. In an identification system for comparing a megnetically coded identification card against a magnetically coded master card, means to limit the holder of the identification card from entering an area proscribed for reasons of military or commercial security comprising reading means for simultaneously reading identification and master cards and comparing means including a discriminating circuit the input of which is fed by a signal generated from the identification card and the master card at said comparing means and the output of which measures the difference between the respective inputs from the comparing of the master card and the identification card, the output of said discriminating circuit being adapted to energize signalling means, signalling means which is energized by an unbalanced output from said discriminating circuit to indicate the absence of identity of the master card and the identification card and storage recording means to record the information which is indicated by the signalling means.

2. In an identification system for comparing a magnetically coded identification card against a magnetically coded master card, means to limit the holder of the identification card from entering an area proscribed for reasons of military or commercial security comprising reading means for simultaneously reading identification and master cards, said reading means comprising a motor driven magnetic head for each card and slip rings for each head, and comparing means including a discriminating circuit the input of which is fed by a signal generated from the identification card and the master card at said comparing means and the output of which measures the difference between the respective inputs from the comparing of the master card and the identification card, the output of said discriminating circuit being adapted to energize signalling means, signalling means which is energized by an unbalanced output from said discriminating circuit to indicate the absence of identity of the master card and the identification card and storage recording means to record the information which is indicated by the signalling means.

3. In an identification system for comparing a magnetically coded identification card against a magnetically coded master card, means to limit the holder of the identification card from entering an area proscribed for reasons of military or commercial security comprising duplicating and recording means for making additional magnetical coded cards in accordance with the master card, reading means for simultaneously reading identification and master cards and comparing means including a discriminating circuit the input of which is fed by a signal generated from the identification card and the master card at said comparing means and the output of which measures the difference between the respective inputs from the comparing of the master card and the identification card, the output of said discriminating circuit being adapted to energize signalling means, signalling means which is energized by an unbalanced output from said discriminating circuit to indicate the absence of identity of the master card and the identification card and storage recording means to record the information which is indicated by the signalling means.

4. In an identification system for comparing a magnetically coded identification card against a magnetically coded master card, means to limit the holder of the identification card from entering an area proscribed for reasons of military or commercial security comprising recording means for adding a change in coding from a new master card to an identification card, reading means for simultaneously reading identification and master cards and comparing means including a discriminating circuit the input of which is fed by a signal generated from the identification card and the master card at said comparing means and the output of which measures the difference between the respective inputs from the comparing of the master card and the identification card, the output of said discriminating circuit being adapted to energize signalling means, signalling means which is energized by an unbalanced output from said discriminating circuit to indicate the absence of identity of the master card and the identification card and storage recording means to record the information which is indicated by the signalling means.

5. In an identification system for comparing a magnetically coded identification card against a magnetically coded master card, means to limit the holder of the identification card from entering an area proscribed for reasons of military or commercial security comprising recording means for adding a change in coding from a new master card to an idetification card and duplicating means for making additional magnetic cards including the changes taken from a new master card, reading means for simultaneously reading identification and master cards and comparing means including a discriminating circuit the input of which is fed by a signal generated from the identification card and the master card at said comparing means and the output of which measures the difference between the respective inputs from the comparing of the master card and the identification card, the output of said discriminating circuit being adapted to energize signalling means, signalling means which is energized by an unbalanced output from said discriminating circuit to indicate the absence of identity of the master card and the identification card and storage recording means to record the information which is indicated by the signalling means.

6. A system as claimed in claim 5 wherein the storage recording means comprises a micro-filming unit.

7. A system as claimed in claim 5 provided with the visual monitoring station having a closed television circuit for visually comparing the identification card and holder of the card at a remote station.

8. A system as claimed in claim 5 wherein said storage recording means comprises a memory device and telemetering means from which information is stored on said memory device for abstracting at a remote station.

9. A system as claimed in claim 7 wherein the closed television circuit is provided with additional micro-film recording means and a receiving station at a remote area.

References Cited in the file of this patent

UNITED STATES PATENTS

| | | |
|---|---|---|
| 2,714,201 | Whitehead | July 26, 1955 |
| 2,740,952 | Jacobs | Apr. 3, 1956 |
| 2,754,496 | Embry et al. | July 10, 1956 |
| 2,769,873 | Noregaard | Nov. 6, 1956 |
| 2,774,056 | Stafford et al. | Dec. 11, 1956 |